United States Patent [19]

Hara et al.

[11] Patent Number: 5,202,181
[45] Date of Patent: Apr. 13, 1993

[54] ADHESIVE WITH VARIABLE ADHESIVITY

[75] Inventors: Yoshio Hara; Nobuo Sugiyama, both of Kanagawa, Japan

[73] Assignee: Fuji Photo Film Co., Ltd., Kanagawa, Japan

[21] Appl. No.: 864,186

[22] Filed: Apr. 3, 1992

Related U.S. Application Data

[63] Continuation of Ser. No. 316,928, Feb. 28, 1989, abandoned.

[30] Foreign Application Priority Data

Feb. 29, 1988 [JP] Japan .................................. 63-47132

[51] Int. Cl.$^5$ .............................................. C09J 7/02
[52] U.S. Cl. ..................................... 428/350; 428/355
[58] Field of Search ................................. 428/350, 355

[56] References Cited

U.S. PATENT DOCUMENTS

| | | | |
|---|---|---|---|
| 3,730,825 | 5/1973 | Nakane | 428/350 |
| 4,505,976 | 3/1985 | Doehnert | 428/355 |
| 4,868,045 | 9/1989 | Horiki | 428/355 |

FOREIGN PATENT DOCUMENTS

| | | | |
|---|---|---|---|
| 700811 | 12/1964 | Canada | 428/355 |
| 0004780 | 1/1981 | Japan | 428/350 |
| 1047460 | 11/1966 | United Kingdom | 428/350 |

Primary Examiner—Jenna L. Davis
Attorney, Agent, or Firm—Young & Thompson

[57] ABSTRACT

An adhesive is made by mixing at least a peelable pressure-sensitive adhesive and a fixable remoistening adhesive that becomes strongly adherent as a result of moistening with water. The adhesive has peelable adhesivity; but when water is applied to the adhesive, the adhesivity changes to a strong adhesivity. The adhesive is applicable to adhesive tapes and adhesives for attaching photographs.

2 Claims, 2 Drawing Sheets

ADHESIVE WITH VARIABLE ADHESIVITY

This application is a continuation of application No. 07/316,928, filed Feb. 28, 1989, now abandoned.

BACKGROUND OF THE INVENTION

The present invention relates to an adhesive, and more particularly to an adhesive which changes to a strongly securable condition from a peelable condition when water is applied thereto.

Various kinds of pressure-sensitive adhesives are known for various applications, which are broadly classified into weak adhesives and strong adhesives. Among the weak adhesives, there are peelable pressure-sensitive adhesives which are peelable after being attached and can be attached again. However, these conventional adhesives have but a single adhesive power and property which causes a certain inconvenience in use. For example, when the peelable pressure-sensitive adhesive is applied to the back of a photographic print for attaching the photographic print to an album sheet, the photographic print can be peeled off if desired. However, when it is necessary to attach the photographic print permanently or strongly, a different, strong adhesive has to be coated on the peelable adhesive previously applied on the back of the photographic print.

OBJECTS OF THE INVENTION

It is therefore an object of the present invention to provide an adhesive which can be changed from a peelable adhesive to a strong adhesive.

It is another object of the present invention to provide an adhesive tape and a photograph bearing the adhesive.

SUMMARY OF THE INVENTION

For achieving these and other objects, according to the present invention, an adhesive is comprised by a mixture of a peelable pressure-sensitive adhesive for temporary attaching and a strongly securing moistenable adhesive which is effective for permanent fixing only when water is applied. An adhesive tape or photograph are coated with this adhesive on the base of the adhesive tape or on the back of the photograph.

According to the present invention, an adhesive tape or photograph can be removed easily without damage due to its peelable adhesivity, but can be attached fixedly after water is applied to the surface of the adhesive, e.g. by means of a moistened sponge or a wet finger or tongue.

BRIEF DESCRIPTION OF THE DRAWINGS

These and other objects and features of the invention will be seen by reference to the following description, taken in connection with the accompanying drawings, in which.

DETAILED DESCRIPTION OF THE INVENTION

Figure 1:
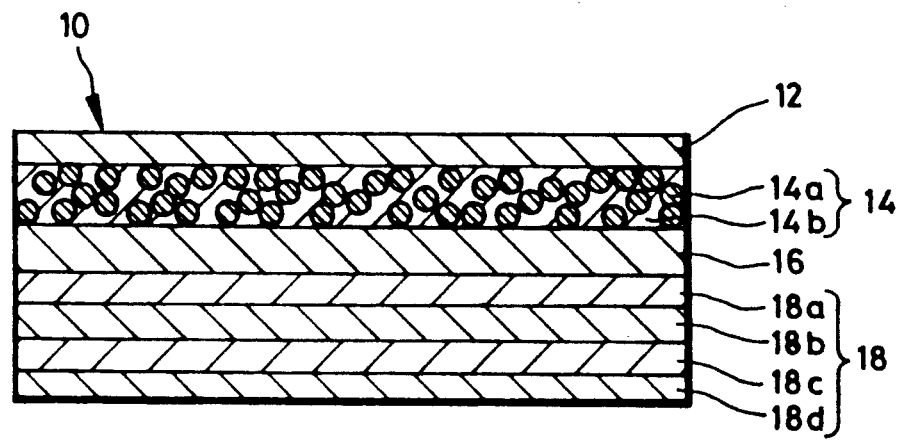
FIG. 1 is a cross sectional view of an adhesive tape embodying an adhesive of the present invention.

Referring to FIG. 1 showing an adhesive tape 10, there is shown a core tape 16 for which, for example, copying paper can be used. Provided on one side of the core tape 16 is an adhesive layer 14 which has both peelable adhesivity when dry, and also strong permanent adhesivity upon the application of water. The adhesive is a mixture of three materials. One is a peelable pressure-sensitive adhesive 14a, another is a remoistening adhesive 14b which becomes strongly adherent in contact with water, and the third is a tackifier (not shown). The peelable pressure-sensitive adhesive 14a is, for example, an emulsion-type acrylic resin adhesive "SEBIAN A5411" (trade name; produced by Daicel Chemical Industries Co., Ltd. in Japan). For the remoistening adhesive 14b, for example, an emulsion-type vinyl acetate resin "SEBIAN A14001" (trade name; produced by Daicel Chemical Industries Co., Ltd. in Japan) can be used. For the tackifier (not shown), for example, the maltodextrin tackifier "AMICOL No. 3L" (trade name; produced by Nippon Starch Chemical Co., Ltd. in Japan) can be used. The weight percentages of the mixture are about 80%, 4% and 16% in that order. In FIG. 1, the remoistening adhesive 14b is schematically illustrated as large grains for ease of illustration. The thickness of the adhesive layer 14 is about $30\mu$, sufficient to ensure adhesion. Onto the adhesive layer 14, a peelable protective tape 12, for example, "66X-832" (trade name; produced by Fujimori Kogyo Co., Ltd. in Japan) is laminated.

On the other side of the core tape 16, a commercially-available double-coated adhesive tape 18, for example, "DF-2760KMS-90" (trade name; produced by Toyo Ink Mfg. Co., Ltd. in Japan) is attached. This double-coated adhesive tape 18 comprises a core tape 18b of polyethylene terephthalate, strongly adherent (not peelable) pressure-sensitive adhesive layers 18a and 18c provided on both sides of the core tape 18, and a peelable protective tape 18d laminated onto the surface of the pressure-sensitive adhesive layer 18c.

To conduct a peel test of the adhesive tape 10 made of these materials, the peelable protective tape 18d was peeled apart from the adhesive tape 10. Thereafter, a sheet, e.g. lumilar colored type white "75X20" (trade name; produced by Toray Industries, Inc. in Japan) was attached on the surface of the strongly adherent pressure-sensitive adhesive layer 18c. Next, the peelable protective tape 12 was peeled apart and then a copying paper was attached on the adhesive layer 14. The peel test was carried out by JIS (the Japan Industrial Standards) Z0237-1980, a 180° peeling angle method, obtaining an adhesive strength of 20 g/25 mm when the width is 25 mm. Another peel test was carried out for the adhesive layer 14 but after applying water about 2 g/m² to the adhesive layer 14 with a sponge. The obtained value of the peel test was 700 g/25 mm when the width is 25 mm.

Figure 2:
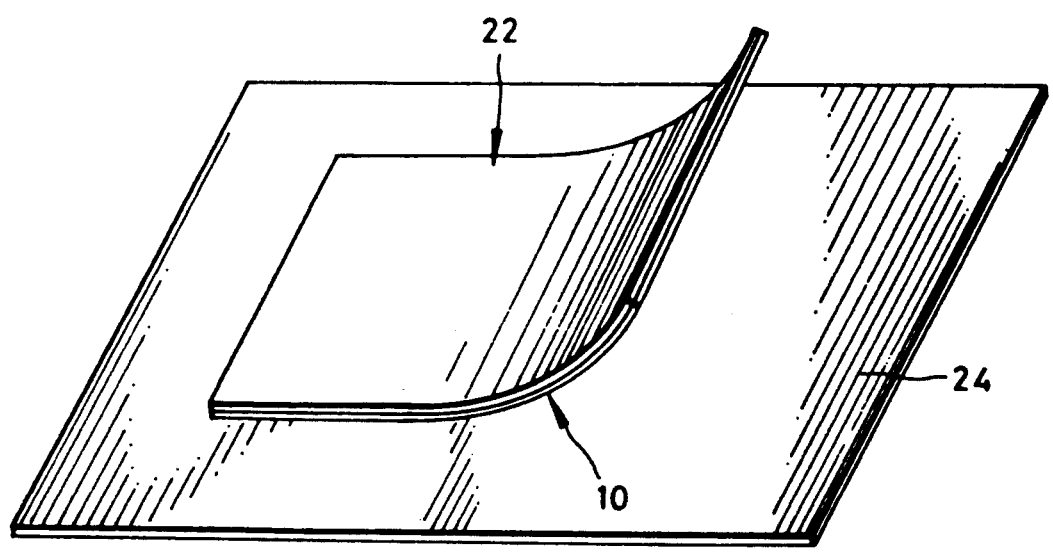
FIG. 2 is a perspective view showing how a photograph with the adhesive tape of FIG. 1 on its back surface is attached to an album sheet.

Referring now to FIG. 2, the adhesive tape 10 is used for attaching a photograph 22 on an album sheet 24. In a photofinishing laboratory, the photograph 22 is mounted on the album sheet 24 when the mounting is requested by the customer. To effect this mounting, the peelable protective tape 18d is peeled from the adhesive tape 10, and the adhesive tape 10 is attached to the back of the photograph 22 due to the adhesivity of the strongly adherent pressure-sensitive adhesive layer 18c.

Next, the peelable protective tape 12 is peeled off and then the photograph 22 is placed on the album sheet 24, adhesive side down. Upon pressing the photograph 22 with the fingers gently, the photograph 22 is peelably attached to the album sheet due to the adhesivity of the dry adhesive layer 14. Even after this, the photograph 22 can be peeled off without damage either to the photograph 22 or to the album sheet 24 and the photograph 22 can be reattached on another sheet repeatedly, because only the peelability of the adhesive layer 14 is involved. If the photograph 22 is to be permanently mounted on the album sheet 24 or on another sheet, water is applied to the surface of the adhesive layer 14 before mounting, thereby causing the strong adhesivity of the remoistening adhesive 14b to be effective. The photograph 22 is fixedly mounted on the album sheet 24 and cannot be peeled off without damage to the photograph 22 and/or the album sheet 24.

Adhesives tapes having the above-mentioned adhesivity which changes from peelable adhesivity to strongly adherent adhesivity and having sizes suitable for photographs may be commercially provided by manufacturers, and users may mount photographs by the use of a purchased adhesive tape of this type.

Figure 3:
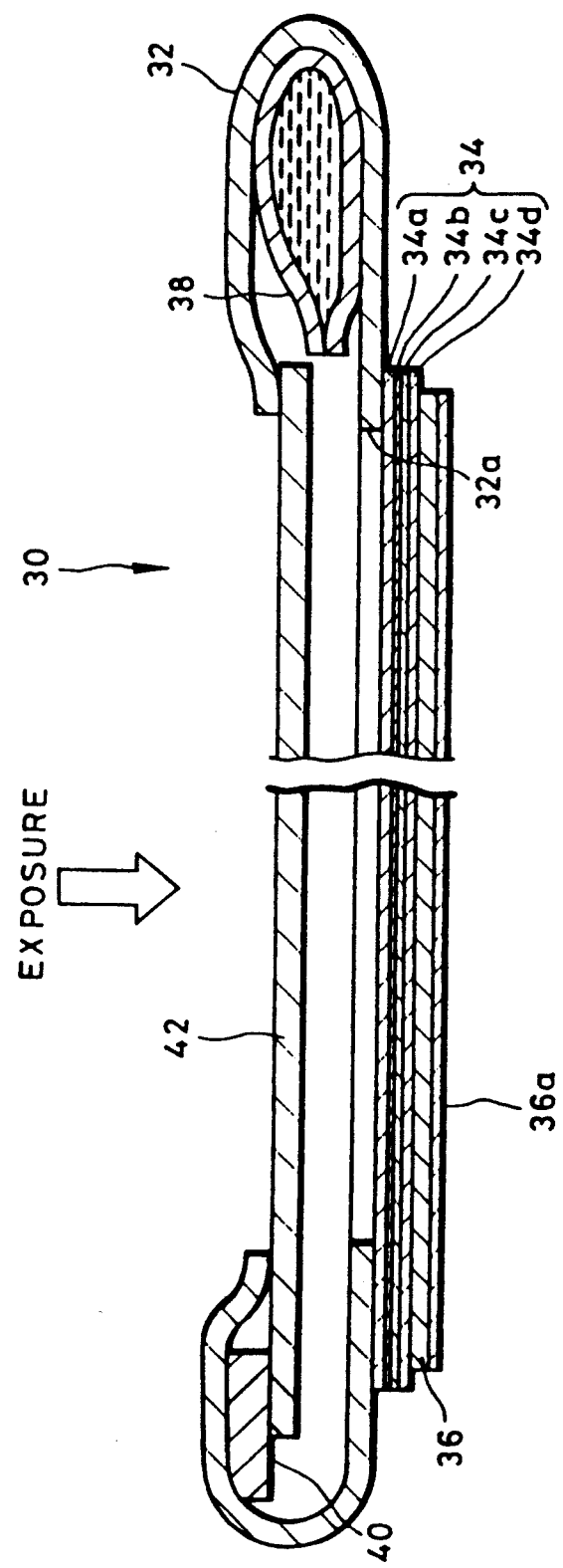
FIG. 3 is a cross sectional view of an embodiment of the present invention in self-processing film units.

In FIG. 3, the adhesive is used on a peelable-type self-processing photographic film unit 30 (which is hereinafter referred to as a film unit) for instant cameras. This film unit 30 will be briefly explained below although it is disclosed in greater detail in U.S. application Ser. No. 07/269,016, filed Nov. 9, 1988.

The film unit 30 comprises a mask member 32 with an exposure opening 32a, a photosensitive sheet 34 attached to the mask member 32 and covering the opening 32a, an adhesive layer 36 provided on the back of the photosensitive sheet 34, together with a protective sheet or separator 36a, a rupturable pod 38 containing developer, and a transparent cover sheet 42 which is attached to the folded sides, opposing each other, of the mask member 32 and to rails (not shown) disposed along the edges of the other opposing sides of the mask member 32. The photosensitive sheet 34 further comprises a photosensitive emulsion layer 34a, a peelable interlayer 34b, an image-receiving layer 34c, and a supporting sheet 34d, on which the adhesive layer 36 is provided. The adhesive layer 36 includes a mixture of the pressure-sensitive adhesive and remoistening adhesive as shown in FIG. 1.

The thus-constructed film unit 30, after being exposed in an instant camera, is moved out of the camera by means of a pair of rollers (not shown) incorporated therein. During this transportation, the rupturable pod 38 is ruptured due to grasping by the rollers, thereby releasing and spreading the developer in the space between the transparent cover sheet 42 and the photosensitive sheet 34. By the action of he spread developer, a latent image is gradually formed in the photosensitive emulsion layer 34a and transferred to the image-receiving layer 34c, forming a visible image therein. After at least a predetermined processing time, the image-receiving layer 34c, the supporting sheet 34d, and the adhesive layer 36 with the protective sheet 36a are removed as a unit from the film unit 30 thanks to the peelable interlayer 34b, thereby producing an instant photograph with the adhesive layer 36 on the back thereof.

For storage, the instant photograph is attached to an album sheet after peeling the protective sheet 36a from the photograph. If the attachment is not accurate, the instant photograph can be peeled from the album sheet and be reattached. If the instant photograph is intended to be permanently fixed on the mounting sheet, water is applied to the surface of the adhesive layer 36 before mounting. After the adhesive layer 36 dries, the instant photograph is strongly adhered to the album sheet.

In the present invention, as will be easily seen from the above embodiments, the adhesive tape includes adhesive sheets.

The adhesive according to the present invention can be used for sheet prints each of which has many small prints peelably attached on the peelable protective base sheet, and for stickers and labels.

As many apparently widely different embodiments of this invention may be made without departing from the spirit and scope thereof, it is to be understood that the invention is not limited to the specific embodiments thereof except as defined in the appended claims.

What is claimed is:

1. An adhesive assembly comprising a substratum, and adhered on the substratum a layer of an adhesive comprising an intimate dry mixture of:
   a peelable pressure-sensitive adhesive which is an acrylic resin adhesive;
   an adhesive which becomes strongly adherent only in the presence of water and which is a vinyl acetate emulsion resin; and
   a tackifier for preventing deterioration of adhesivity of the peelable pressure-sensitive adhesive, said tackifier being a maltodextrin tackifier;
   the nature and proportions of said peelable pressure-sensitive adhesive and adhesive which becomes strongly adherent only in the presence of water being such that the adherence of said substratum to another surface via said layer of adhesive, when said layer of adhesive is wet with water, is substantially greater than the adherence of said substratum to said another surface via said layer of adhesive when said layer of adhesive is dry and only said pressure-sensitive adhesive adheres said substratum to said another surface.

2. An adhesive assembly as claimed in claim 1, wherein said admixture includes about 80 parts by weight of said peelable pressure-sensitive adhesive, about 4 parts by weight of said vinyl acetate resin, and about 16 parts by weight of said tackifier.

* * * * *